(12) United States Patent
Bains

(10) Patent No.: US 9,870,325 B2
(45) Date of Patent: Jan. 16, 2018

(54) COMMON DIE IMPLEMENTATION FOR MEMORY DEVICES WITH INDEPENDENT INTERFACE PATHS

(71) Applicant: Intel Corporation, Santa Clara, CA (US)

(72) Inventor: Kuljit S Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 14/865,718

(22) Filed: Sep. 25, 2015

(65) Prior Publication Data
US 2016/0342539 A1 Nov. 24, 2016

Related U.S. Application Data

(60) Provisional application No. 62/163,863, filed on May 19, 2015.

(51) Int. Cl.
| | |
|---|---|
| *G06F 13/00* | (2006.01) |
| *G06F 3/00* | (2006.01) |
| *G06F 13/28* | (2006.01) |
| *G06F 12/00* | (2006.01) |
| *G06F 12/06* | (2006.01) |
| *G06F 9/26* | (2006.01) |
| *G06F 9/34* | (2006.01) |
| *G06F 13/16* | (2006.01) |

(52) U.S. Cl.
CPC .................... *G06F 13/16* (2013.01)

(58) Field of Classification Search
CPC ...... G06F 12/06; G06F 12/10; G06F 12/1009; G06F 13/1657; G06F 2212/152; G06F 2212/657; G06F 12/109; G06F 13/1663; G06F 12/00

USPC ....... 711/154, 5, 150, 203, 149; 365/230.03; 710/100, 107, 3
See application file for complete search history.

(56) References Cited

U.S. PATENT DOCUMENTS

| | | | | |
|---|---|---|---|---|
| 4,481,578 A | * | 11/1984 | Hughes | G06F 13/28 |
| | | | | 345/502 |
| 5,617,575 A | * | 4/1997 | Sakakibara | G06F 13/18 |
| | | | | 708/520 |
| 5,708,597 A | * | 1/1998 | Kelem | G11C 11/005 |
| | | | | 365/189.011 |

(Continued)

OTHER PUBLICATIONS

International Search Report and Written Opinion for PCT Patent Application No. PCT/US2016/033159, dated Aug. 8, 2016, 13 pages.

*Primary Examiner* — Faisal M Zaman
(74) *Attorney, Agent, or Firm* — Compass IP Law PC

(57) ABSTRACT

A memory device includes at least two independent interface paths, an interface path including multiple memory banks. The memory device can selectively operate in a bank mode or a bank group mode. In bank mode, banks are operated as logical banks, where separate physical banks from different interface paths operate in parallel. When a logic bank is accessed, all physical banks belonging to the logical bank are accessed in parallel across the interface paths. In bank group mode, banks are operated independently, but accessed in bank groups. A separate interface path is operated as an independent bank group, and a bank is individually accessed in its bank group. In bank group mode, back to back access to separate bank groups is possible without resulting in access delay.

22 Claims, 7 Drawing Sheets

(56) References Cited

U.S. PATENT DOCUMENTS

| | | | | |
|---|---|---|---|---|
| 6,185,654 B1* | 2/2001 | Van Doren | | G06F 12/0607 |
| | | | | 711/147 |
| 6,662,263 B1* | 12/2003 | Wong | | G06F 12/0246 |
| | | | | 365/185.11 |
| 7,277,982 B2* | 10/2007 | Calvignac | | G06F 13/1642 |
| | | | | 711/105 |
| 7,948,816 B2* | 5/2011 | Frey | | G11C 5/025 |
| | | | | 365/189.05 |
| 8,120,958 B2 | 2/2012 | Bilger et al. | | |
| 8,397,010 B1* | 3/2013 | Venkatramani | | G06F 12/0607 |
| | | | | 711/150 |
| 8,964,443 B2 | 2/2015 | Vogt | | |
| 2002/0112119 A1 | 8/2002 | Halbert et al. | | |
| 2002/0114206 A1* | 8/2002 | Honigschmid | | G11C 5/02 |
| | | | | 365/230.03 |
| 2002/0116587 A1* | 8/2002 | Modelski | | G06F 13/36 |
| | | | | 711/154 |
| 2002/0131315 A1* | 9/2002 | Shirley | | G11C 7/065 |
| | | | | 365/230.03 |
| 2003/0088742 A1* | 5/2003 | Lee | | G06F 12/084 |
| | | | | 711/147 |
| 2003/0131161 A1* | 7/2003 | Dodd | | G06F 13/1668 |
| | | | | 710/35 |
| 2003/0135699 A1* | 7/2003 | Matsuzaki | | G06F 13/1605 |
| | | | | 711/149 |
| 2003/0156486 A1* | 8/2003 | Tanaka | | G11C 7/065 |
| | | | | 365/230.03 |
| 2004/0019756 A1* | 1/2004 | Perego | | G11O 5/025 |
| | | | | 711/170 |
| 2004/0117566 A1 | 6/2004 | McClannahan et al. | | |
| 2004/0210729 A1* | 10/2004 | Horii | | G11C 7/1042 |
| | | | | 711/156 |
| 2005/0144375 A1* | 6/2005 | Bains | | G06F 13/161 |
| | | | | 711/105 |
| 2006/0236072 A1* | 10/2006 | Lyon | | G06F 12/0607 |
| | | | | 711/206 |
| 2009/0097348 A1* | 4/2009 | Minzoni | | G11C 7/10 |
| | | | | 365/230.03 |
| 2010/0241784 A1* | 9/2010 | Iyer | | G06F 12/1009 |
| | | | | 711/5 |
| 2011/0173369 A1* | 7/2011 | Julien | | G06F 13/1684 |
| | | | | 711/5 |
| 2012/0182821 A1* | 7/2012 | Perego | | G06F 11/1048 |
| | | | | 365/230.03 |
| 2012/0210096 A1* | 8/2012 | Li | | G06F 13/1663 |
| | | | | 711/209 |
| 2013/0336039 A1 | 12/2013 | Frans | | |
| 2014/0075113 A1* | 3/2014 | Takizawa | | G11C 7/1009 |
| | | | | 711/114 |
| 2014/0192583 A1 | 7/2014 | Rajan et al. | | |
| 2014/0325105 A1 | 10/2014 | Prete et al. | | |
| 2015/0302904 A1 | 10/2015 | Yoon et al. | | |
| 2016/0092383 A1 | 3/2016 | Bains et al. | | |

* cited by examiner

TABLE 500

| SPEC BASIS | TYPE | BG | BANKS | MIN BL | PG SIZE | tCCD_L | tCCD_S |
|---|---|---|---|---|---|---|---|
| LPDDR4 | 2CH x16 | 1 | 8 | 16 | 2K | 8 | 8 |
|  | 2CH x8 | 1 | 8 | 16 | 1K | 8 | 8 |
| LPDDR5 | 2CH x16 | 1 | 8 | 32 | 2K | 16 | 16 |
|  | 2CH x8 | 2 | 8 | BC-16 | 1K | 16 | 8 |
| LPDDR5 | 2CH x16 | 4 | 2 | 16 | 2K | 12 | 8 |
|  | 2CH x8 | 8 | 2 | 16 | 1K | 12 | 8 |
| LPDDR5 | 2CH x16 | 2 | 4 | 16 | 2K | 12 | 8 |
|  | 2CH x8 | 4 | 4 | 16 | 1K | 12 | 8 |

510 → LPDDR4
520 → LPDDR5
530 → LPDDR5
540 → LPDDR5

FIG. 5

COMMON DIE IMPLEMENTATION FOR MEMORY DEVICES WITH INDEPENDENT INTERFACE PATHS

RELATED CASES

The present application is a nonprovisional application based on U.S. Provisional Application No. 62/163,863, filed May 19, 2015. The present application claims the benefit of priority of that provisional application, and the provisional application is hereby incorporated by reference.

FIELD

Embodiments of the invention are generally related to memory devices, and more particularly to a common memory device implementation for memory subsystems having different data bus bandwidth.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2015, Intel Corporation, All Rights Reserved.

BACKGROUND

Computing devices use memory devices to store data and code for a processor to execute its operations. There are different types of memory devices, which are traditionally used in different contexts. For example, server devices tend to use memory devices that allow increased memory capacity per channel. Thus, memory devices with narrower interfaces tend to be selected for servers. However, such memory devices tend to consume more power, making such configurations less desirable in mobile implementations or other implementations where power consumption is an important consideration. Despite a focus on power for mobile implementations, mobile devices continue to become more capable, and there is an increasing demand for memory devices that have greater memory capacities. Traditionally, increasing capacity using memory devices having wider I/O (input/output) interfaces requires adding more channels, with increases in hardware and cost.

Additionally, transition from one generation of memory device to another has traditionally been expected to have an increase in performance based on an increase in throughput. Performance increases can be the result of doubling the data bus speed. However, to increase the data bus speed requires the memory device to exchange data at a correspondingly increased rate. However, doubling the memory core frequency to match a doubling of data bus speed results in cost increases that are impractical for commodity usage. Another approach is to double prefetch to increase minimum data transfer from each device. Increasing prefetch is a nonissue if per device access granularity multiplied by number of devices on a rank is less than or equal to the cacheline size of the processor (assuming independent memory channels). However, memory technologies are currently reaching a point where doubling the prefetch will exceed the cacheline size per rank for client systems that use x8 devices. Exceeding the cacheline size per rank will result in fewer devices per rank, requiring the increase of the number of channels per memory device die. It will be understood that the convention 'xN' (where N is a number) refers to an external data bus interface. Thus, x8 refer to an 8-bit wide interface, and x16 refers to a 16-bit wide interface.

Many low power memory devices have traditionally been designed with wider data bus interfaces (e.g., x16 devices as opposed to traditional x8 devices), which limits data storage capacity per channel, but can be used in more power efficient designs. The difference in bus interfaces provides memory device with the same capacity having different interfaces based on differing implementations. However, such differing implementations traditionally required making two different memory die to allow for the different implementations. Making very similar devices that are slight variations of each other for different implementations can increase design and build costs, as well as cause production and inventory issues.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 5 is an embodiment of a table illustrating different low power memory device configurations, including a configuration that has bank mode and bank group mode.

Figure 1:
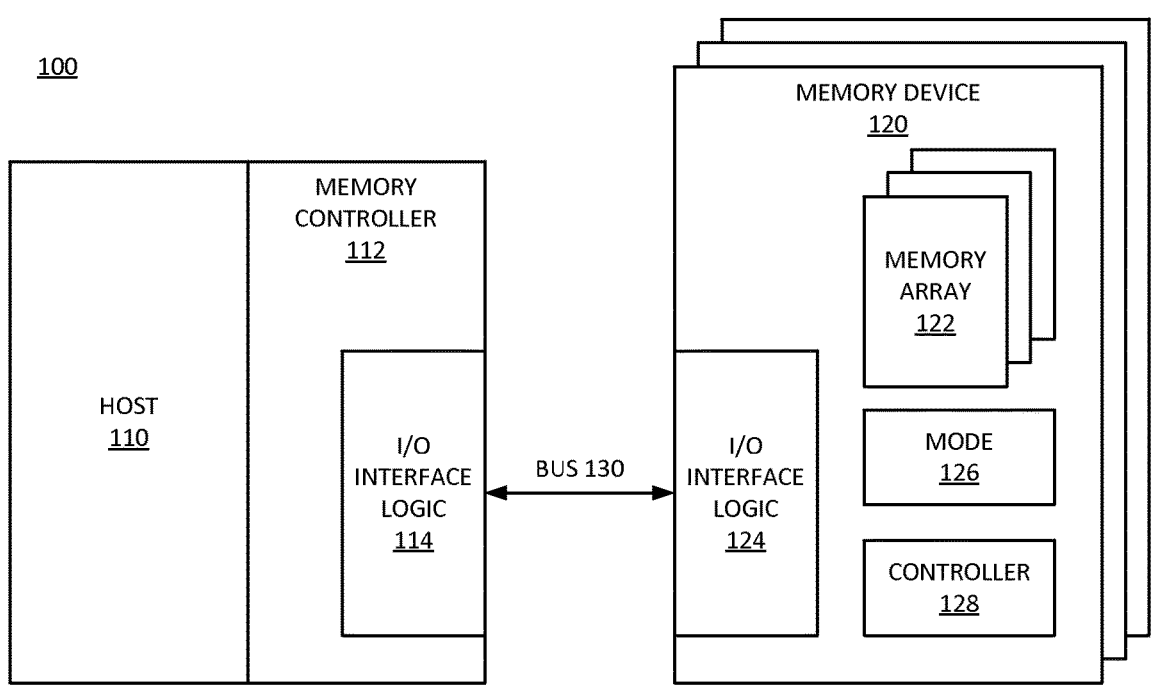
FIG. 1 is a block diagram of an embodiment of a system with a memory device that can be configured to interface with system data buses of different bandwidth based on an operating mode of the memory device.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a memory device supports both full-bandwidth implementations and narrower bandwidth implementations. Thus, one embodiment of a memory device die can support both x8 and x16 devices. The memory device and a memory controller interface over a system data bus. The memory device that supports both full-bandwidth and narrower bandwidth system bus implementations allows the same memory device to be used in different configurations with a system data bus that provides greater or lesser bandwidth. The memory device includes at least two independent interface paths, each including multiple memory banks. The memory device can selectively operate in a bank mode or a bank group mode. In bank mode, banks are operated as logical banks, where separate physical banks from each interface path operate in parallel. When a logical bank is accessed, all physical banks belonging to the logical bank are accessed in parallel across the interface paths. In bank group mode, banks are operated independently, but accessed in bank groups. Each separate interface path is operated as an independent bank group, and each bank is individually accessed in its bank group. In bank group mode, back to back access to separate bank groups is possible without resulting in access delay.

Reference to bank groups refers to a bank group architecture. In the bank group architecture, a memory controller can address a specific bank with a bank group identifier (BG[N−1]:0) and a bank identifier or bank address identifier (BA[M−1:0]). The bank group identifier specifies the bank group, and a bank address specifies the bank within the bank group. Each bank group has multiple banks similarly addressed. For example, BG0 can have banks B0-B3, and BG1 can have banks B0-B3. In bank group mode as described herein, banks B0-B3 of BG0 are separately addressable from banks B0-B3 of BG1 by the combination of bank group and bank address information. In bank mode as described herein, for example, bank B0 of both BG0 and BG1 can be accessed in parallel in response to identification of bank address BA0, and the corresponding banks of separate interface paths operate as a single, logical bank. Bank mode and bank group mode can be selectively enabled for the same hardware memory device, enabling a single chip or die to function either in bank group mode or bank mode.

Prior implementations of memory devices would have a separate device or a separate integrated circuit (I/C) die for each different memory implementation. Thus, memory packaged for a x16 implementation would include a different die than a memory of the same capacity packaged for use in a x8 implementation. It will be understood that x16 refers to a device with a 16-bit wide data I/O (input/output) interface, and x8 refers to a device with a 8-bit wide data I/O interface. It will be understood that the designation of a device as x16, x8, or other refers to the data bus bandwidth, and does not limit the device to exchange other bits of data on the same cycles over different connectors or buses.

Reference to memory devices can apply to different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

LPDDR4 uses an internal prefetch of 256 bits with a burst length of 16 (thus, a x16 interface with 16 transfer cycles for a total of 256 bits). At 4.2 GT/s (giga-transfers per second) the required core cycle time is 266 MHz. Next generation memory devices have been discussed having double the transfer rate at 8.4 GT/s. Maintaining the same prefetch size would require increasing the core speed to 533 MHz. Alternatively, the same core cycle speed of 266 MHz can be used by doubling the internal prefetch. Increasing the core frequency increases power usage and die size much more than increasing the internal prefetch. Thus, next generation memory devices are proposed to have an internal 512 bit prefetch.

The core cycle time is dictated by the timing of tCCD, which is the delay time from CAS to CAS (column address strobe or signal), which is used to trigger an access operation. An access operation can be, for example, a Write or a Read. DDR devices typically use a two-cycle command, such as a read command followed by a CAS command to trigger the access. Thus, tCCD can generically be understood as the timing between consecutive access commands. DDR4 implements additional bank groups (groups of independently or separately addressed memory banks) to improve performance with respect to tCCD. By using separate bank groups, access can be interleaved across different bank groups. Thus, DDR4 implements tCCD_S and tCCD_L timings (where the 'S' is for short and the 'L' is for long). Back to back access to different bank groups (interleaving) allows the use of tCCD_S timing and streaming of data at up to 100% of the available bandwidth. Back to back accesses to the same bank group require the use of tCCD_L, and the longer timings prevent 100% bus utilization.

However, the use of bank groups results in a loss of performance unless bank resources are doubled. Thus, for example, 8 banks would need to be replaced by 4 bank groups with 4 banks each to match the performance without bank groups. The addition of bank groups, especially when doubling the bank resources, adds significantly to die size. Bank group architecture can also cause what is referred to as a "glass jaw" scenario with streaming applications. In a glass jaw scenario, repeated access can occur to the same bank, which then repeatedly requires the use of the longer access time (tCCD_L), which causes access delays.

As described herein, a common die architecture allows access to a common group of bank resources either in bank groups or as individual banks. Thus, the performance of individual banks is achieved when utilizing the resources in bank mode. In bank group mode the same group of banks is accessed, but without the need to double the resources. Thus, the number of resources does not need to be increased for bank group mode. In bank mode, the bank resources are operated as virtual or logical banks, where access to one bank address accesses multiple banks in parallel. In bank group mode, each bank is individually addressable within the bank group. Such an approach to banks allows for a common die architecture that can be implemented for both mobile systems and client systems. For example, a common die architecture can allow a x16 bank mode and a x8 bank group mode, in accordance with additional details below. Such a common die preserves the ability to scale capacity without having to increase the number of channels. In one embodiment, whether the device operates in bank group mode versus bank mode can be dependent on burst length. For example, a device can be configured to operate with a certain burst length, and operate in a bank mode or bank group mode corresponding to the burst length.

FIG. 1 is a block diagram of an embodiment of a system with a memory device that can be configured to interface with system data buses of different bandwidth based on an operating mode of the memory device. System 100 includes elements of a memory subsystem in a computing device. Host 110 represents a host computing platform that executes an operating system (OS) and applications. The OS and applications execute operations that result in memory accesses. Host 110 includes a processor or processing unit, which can include a single and/or a multicore processor. The processing unit can be a primary processor such as a CPU (central processing unit) and/or a peripheral processor such as a GPU (graphics processing unit). System 100 can be implemented as an SOC, or be implemented with standalone components.

Memory controller 112 represents control logic or circuitry that generates memory access commands in response to the execution of operations by the processor(s). Memory controller 112 accesses one or more memory devices 120. In one embodiment, system 100 includes multiple memory controllers. In one embodiment, system 100 includes one or more memory controllers per channel, where a channel couples to buses and signal lines that couple to multiple memory devices in parallel. Thus, a memory controller can access a number of memory devices in parallel on a channel. Each channel can be considered an independent access path to memory. In one embodiment, memory controller 112 is part of host 110, such as logic implemented on the same die or package space as a host processor.

Memory controller 112 includes I/O interface logic 114 to couple to system bus 130. System bus 130 has a data bus with a bandwidth. Based on design and/or implementation of system 100, system bus 130 can have more or less bandwidth per memory device. For example, system bus 130 can be of a fixed size but use memory devices that have either a x32 interface, a x16 interface, a x8 interface, or other interface. The interface size of the memory devices is a controlling factor on how many memory devices can be used concurrently per channel in system 100 or coupled in parallel to the same signal lines.

Memory devices 120 represent memory resources for system 100. In one embodiment, each memory device 120 is a separate memory die, which can include multiple (e.g., 2) channels per die. Each memory device 120 includes I/O interface logic 124, which has a bandwidth determined by the implementation of the device (e.g., x16 or x8 or some other interface bandwidth). I/O interface logic 124 and 114 can include pins, connectors, signal lines, and/or other hardware to connect the devices. System bus 130 can be implemented as multiple signal lines coupling memory controller 112 to memory devices 120. System bus 130 includes at least a command and address (C/A) portion and a data portion. The C/A portion can be referred to as a "C/A bus" (and ADD/CMD bus, or some other designation indicating the transfer of commands and address information) and the data portion can be referred to as a "data bus."

Memory devices 120 each include multiple memory arrays 122. Memory arrays 122 represent the logic where memory device 120 stores the data bits. In one embodiment, memory device 120 can be said to have an internal data bus, which refers to a number of bits that are produced in a single read prefetch, or which can be written for a write command. The bandwidth of the internal data bus will depend on the number of memory arrays and the design of the memory arrays. While not specifically shown in system 100, each memory device 120 also includes send and receive logic to determine what data to send and how to drive the signal lines of bus 130 to send the data, as well as logic to decode and route received commands and addresses to memory arrays 122 for execution.

Memory devices 120 each include mode logic 126. Mode logic 126 can refer to a mode register or other register or comparable mechanism within the memory device that stores configuration settings. In one embodiment, the implementation for a specific memory device is set within mode logic 126. In one embodiment, based on settings in mode logic 126, memory device 120 operates in a bank mode or in a bank group mode. The selected mode will affect how many bits of data the memory device processes (for either read or write) for a transfer period of a memory access transaction. A memory access transaction refers to an operation of the memory controller sending a command to the memory device, and the memory device satisfying the request in the command. For example, a write transaction includes memory controller 112 sending a write command to memory device 120, which then stores the data at an address location identified in the command. Similarly, a read transaction includes memory controller 112 sending a read command to memory device 120, which accesses the data at an addressed location and returns it over the data bus to memory controller 112. Memory access transactions typically take multiple cycles to complete. For example, read and write can be controlled by a burst length, which indicates a number of consecutive transfer periods in which to send/receive or input/output data over system bus 130. A transfer period is a period of one or fewer or more clock cycles in which to send a signal over a signal line of system bus 130. For purposes of system 100, mode logic 126 can also represent logic that indicates a burst length and transfer timing. In one embodiment, different logic and/or a different register is used to indicate burst length, transfer timing, and/or an I/O interface mode.

Memory device 120 includes controller 128, which represents control logic within the memory device to control internal operations within the memory device. For example, controller 128 decodes commands sent by memory controller 112 and generates internal operations to satisfy the commands. Controller 128 can determine what mode is selected based on mode 126, and configure the operation of memory array resources (e.g., memory banks) based on the selected mode. Controller 128 can generate control signals to control the routing of bits within memory device 120 to provide a proper interface for the selected mode.

In one embodiment, based on the selected mode, controller 128 performs an internal burst chop operation for prefetched read data. Burst chop is understood as a mechanism that causes a memory device to transfer less data out of the memory device than was accessed in the prefetch. For example, a prefetch may access 256 bits of data and only transmit 128 bits of data. In one embodiment, burst chop includes the memory device sending data on fewer than all available transfer periods. In one embodiment, the memory device can be configured to transfer data on all available transfer periods of a burst length, even though the data transferred is less than what was prefetched.

In one embodiment, in a bank group mode, memory controller 112 and memory device 120 can interleave data between multiple different bank groups within a single memory device 120. In one embodiment, in bank group mode, memory controller 112 and memory device 120 can interleave data between different banks and/or different bank groups of multiple different memory devices 120. Interleaving is generally limited to a single channel. Interleaving allows full bandwidth utilization of the data bus, whereas access to banks back to back from the same interface path could result in a delay that can prevent full bandwidth utilization.

Figure 2:
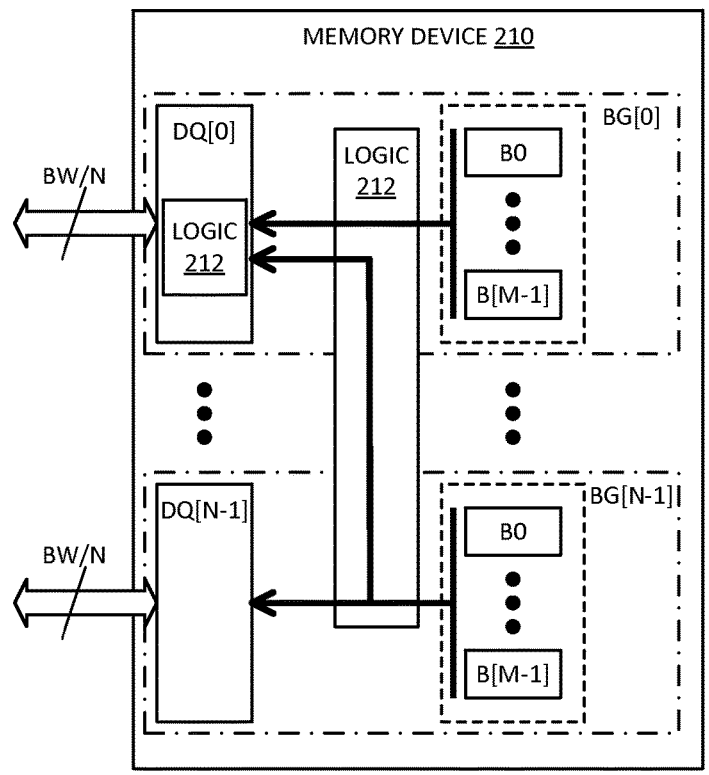
FIG. 2 is a block diagram of an embodiment of a memory device that can interface in different modes with system data buses of different bandwidth.

FIG. 2 is a block diagram of an embodiment of a memory device that can interface in different modes with system data buses of different bandwidth. Memory device 210 is one example of memory device 120 of system 100. In one embodiment, memory device 210 includes more elements than those illustrated. In one embodiment, memory device 120 includes multiple channels of memory. For purposes of one example, memory device 210 only illustrates a single channel. Each channel is independently accessed and controlled. Thus, the timing, the data transfer, command and address exchanges and other operations are separate for each channel. In one embodiment, settings for each channel are controlled by separate mode register or other register settings.

Memory device 210 includes N separate interface paths. While a channel can be an interface path, in one embodiment, a channel can include multiple interface paths. In one embodiment, a channel includes multiple separate and independent interface paths. For purposes of example, consider that each interface path is associated with a group of memory resources that can be separately accessed as a bank group. Thus, each bank group BG[(N−1):0] is illustrated including M banks. In bank mode, in one embodiment, memory device 210 appears to have M banks of memory, where each bank is a virtual bank. Thus, bank B[0] of BG[0] and bank B[0] of BG[M−1] operate together as a logical bank, and are accessed in parallel for a memory access command identifying bank B[0]. In bank group mode, each of the M banks of each bank group is separately addressable, within each bank group. Thus, the internal controller of memory device 210 (not specifically shown) accesses a specific bank group and a specific bank within that bank group. Corresponding banks of other bank groups will not be accessed in bank group mode. Thus, for example, while in bank mode, bank B[0] of BG[0] and bank B[0] of BG[M−1] can operate together and both will execute an access command, but in bank group mode bank B[0] of BG[0] and bank B[0] of BG[M−1] will be addressed separately and not execute the same access command.

Logic 212 determines how to route bits to and from the memory banks. Logic 212 represents any logic or circuitry within memory device 210 that selects how to route bits, and executes operations to route the bits based on the mode. Logic 212 can include signal lines, multiplexers, selection logic, and/or other logic, and/or other circuitry. In one embodiment, in bank mode, memory device 210 includes a bus length of BW bits (bandwidth), with N different I/O interfaces (DQ[(N−1):0]) each providing BW/N bits. In one embodiment, in bank group mode, bits are internally routed from the selected bank group to a single BW/N bit interface (e.g., DQ[0]). Thus, external devices, such as a memory controller, only have BW/N signal lines to exchange data with memory device 210 (per channel, assuming multiple channels). The I/O interfaces represent signal lines, logic circuits, and/or other elements within memory device 210 that allow memory device 210 to exchange (send and receive) data with a device external to memory device 210.

Consider for purposes of example an implementation where N equals 2. DQ0 and DQ1 can be considered independent interface paths in a bank mode, because each group of banks (BG0 and BG1) provides data to separate I/O interfaces. The memory banks provide data in parallel to provide the full bandwidth possible from memory device 210. In a bank group mode, each group of banks (BG0 and BG1) operates as separate bank groups, and access can be interleaved to the separate banks. Thus, access to one bank will not prevent access to another bank in a different bank group. In one embodiment, a memory device includes 8 bank groups with 4 banks each. In one embodiment, a memory device includes 4 bank groups with 8 banks each. In one embodiment, a memory device includes 4 bank groups with 4 banks each. Other configurations are possible.

Figure 3:
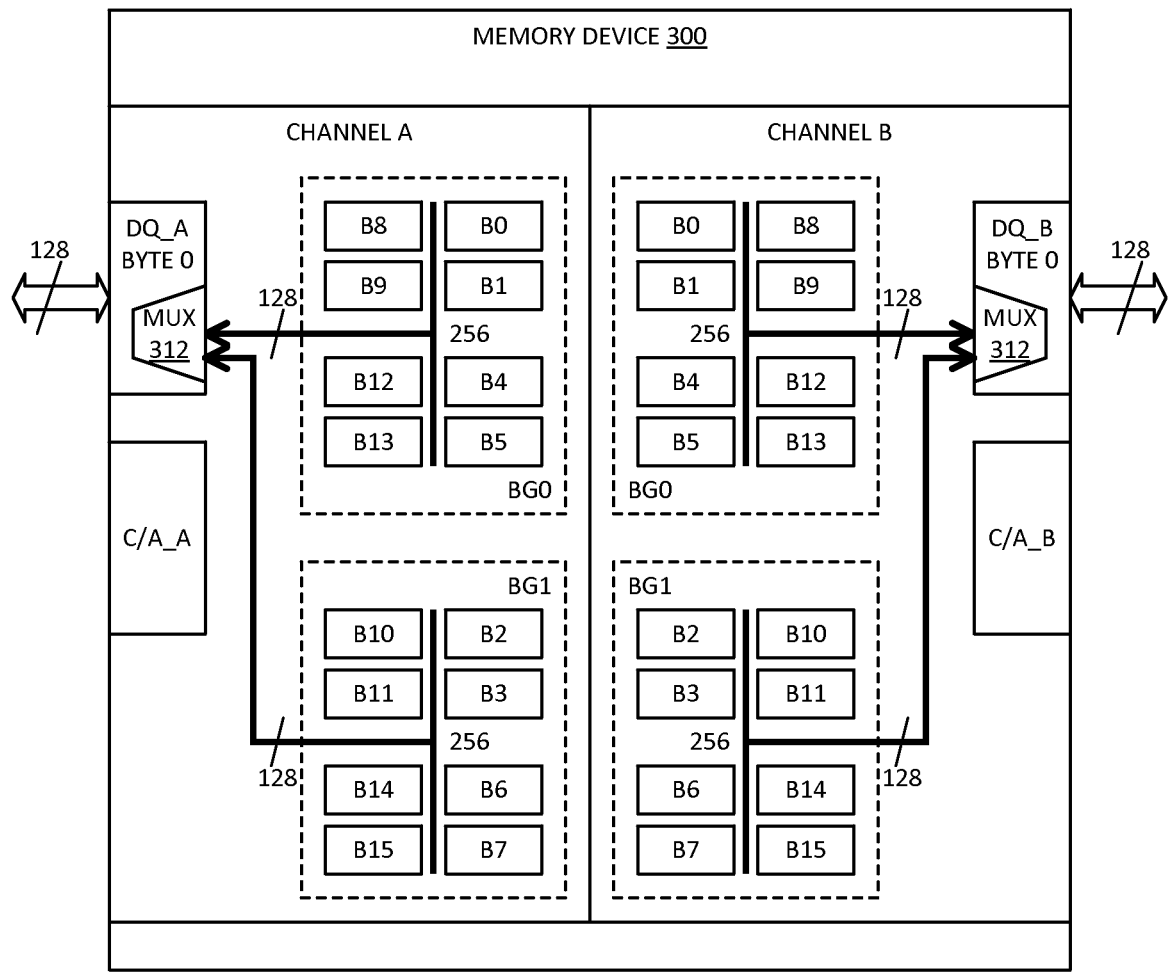
FIG. 3 is a block diagram of an embodiment of a memory device that operates in a bank group mode to interface with a narrower bandwidth bus.

FIG. 3 is a block diagram of an embodiment of a memory device that operates in a bank group mode to interface with a narrower bandwidth bus. In one embodiment, memory device 300 is an example of a memory device in accordance with FIG. 1 and/or FIG. 2. More specifically, memory device 300 represents one embodiment of a memory device in bank group mode, where separate physical banks are operated in separately addressable bank groups. In one embodiment, memory device 300 is configured to operate with a x8 interface. Thus, in one embodiment, memory device 300 can be said to be in x8 mode. In one embodiment, memory device 300 performs burst chop for a x8 implementation. Memory device 300 can be implemented as a common die with the mode of memory device 400 of FIG. 4.

In one embodiment, memory device 300 includes two separate, independent channels, A and B. Each channel operates independently of the other, and can receive and operate on memory access commands independent of what is happening on the other channel. In one embodiment, each channel is a mirror image of the other. For purposes of simplicity, only Channel A is described, and the description for Channel A will be understood to apply equally well to Channel B.

In one embodiment, memory device 300 includes 16 independent bank resources organized as an upper group (BG0) and a lower group (BG1). Each memory access command only executes in a single physical bank (bank mode). For example, a CAS command would only activate one of banks B15:B0. Back to back accesses to the same bank group are dictated by tCCD_L. tCCD_L timings are based on a burst length BL32. Back to back accesses to a different group are dictated by tCCD_S. In one embodiment, tCCD_S is 8 clock cycles to cover a double pumped data bus at a burst length BL16. A streaming application can interleave between BG0 and BG1 with 100% bandwidth utilization. In one embodiment, the bank group mode or the bank mode can be configured to correspond to a burst length setting.

It will be observed that internal prefetch from a particular bank is 256 bits for a read operation. In one embodiment, memory device 300 performs a burst chop operation to transmit only 128 bits (16 B) of data, which can be accomplished with BL16 instead of BL32. Thus, in one embodiment, the system chops the data in half in bank group mode to use only 128 of the 256 bits of prefetched data. It will be understood that consecutive segments of 128 bits of data can be transmitted by alternating between the bank groups. It will be understood that while burst chop has been implemented previously, a channel would be unusable for the non-active cycles. Thus, while burst chop could transmit fewer bits, the interface would be unusable for the entire burst length of transfer periods. Thus, DQ_A (Byte0) would only be inaccessible for the entire BL32, even if only 16 cycles were used in a burst chop mode. Contrast the previous approach with memory device 300, which allows the interface DQ_A to be utilized first by one bank group, and then the other, during the same burst length transfer window, each utilizing half of the full burst length.

Thus, memory device 300 allows both physical and logical separation of the banks, depending on the mode of operation selected (x8 bank group mode, or x16 bank mode). In one embodiment, a memory controller to which memory device 300 is attached will optimize access to all attached memory devices based on specifications of the devices (e.g., as discovered in initialization). Thus, the memory controller can interleave and/or perform address hashing across ranks, die, and bank groups in a x8 or bank group mode configuration. It will be understood that the configuration allows the same die that would be used in a typical x16 mode, simply by changing configuration of the attached memory device. Thus, different operation can be achieved using the same hardware device. Such configurability prevents the limits on capacity resulting from x16 devices, where C/A (command/address) bus, number of channels and number of controllers would have to be doubled to achieve the same capacity as achieved with a x8 device. In such a case, the x8 device and the x16 device can be the same physical device, but with different configuration settings.

It will be understood that while read has primarily been discussed, referring to a 256 bits prefetch, a write operation would also write 256 bits in x16 mode, and can be limited to 128 bits in x8 mode. For purposes of illustration, memory device 300 illustrates data paths for a read command, where data is prefetched from a selected bank and bank group, and sent to a memory controller (not illustrated) via DQ_A. Memory device 300 sends the data in response to a command received over C/A_A identifying the bank group and bank.

As illustrated, an internal prefetch generates 256 bits. It will be observed that memory device 300 only illustrates DQ_A (Byte0), where memory device 400 of FIG. 4 has both DQ_A Byte0 and DQ_A Byte1. In a x16 mode, each bank group would generate 256 bits (as described below in reference to FIG. 4), and transfer its 256 bits out on separate I/O interfaces (DQ_A Byte0 and Byte1). In memory device 300, the memory die would be packaged to have only a single output interface. While the die will still include the hardware for DQ_A Byte1, it will be unused. Instead, the bits from BG1 will be internally routed to DQ_A Byte0. Thus, each read/write transaction results in 256 bits of data transfer in normal operation.

In one embodiment, in a bank group mode, each bank group independently routes 128 bits of data to one common I/O interface per channel, DQ_A Byte 0. In one embodiment, logic (such as multiplexer (mux) 312) within memory device 300 selects one bank group or another to interface with the I/O. It will be understood that additional logic (not specifically illustrated) can be included to internally route between BG1 and DQ_A Byte0. In one embodiment, a controller on-chip to memory device 300 (not specifically shown) manages the internal routing of the data.

Figure 4:
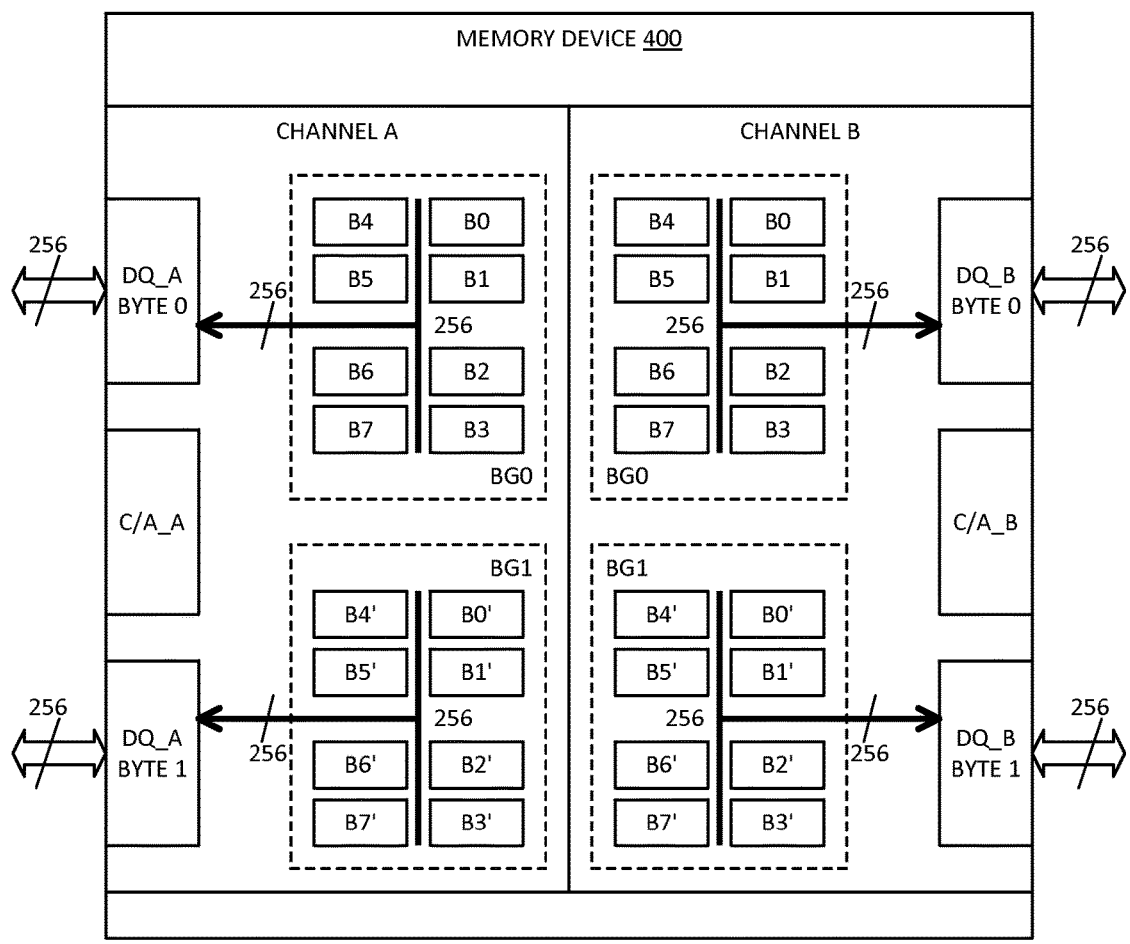
FIG. 4 is a block diagram of an embodiment of a memory device that operates in a bank mode to interface with a wider bandwidth bus.

FIG. 4 is a block diagram of an embodiment of a memory device that operates in a bank mode to interface with a wider bandwidth bus. Memory device 400 is one embodiment of memory device 300 of FIG. 3, when the device is in bank mode. In one embodiment, memory device 400 implements a standard LPDDR4 x16 mode with 2 channels (A and B). It will be observed that the same 16 banks that were identified and operated as B15:B0 in memory device 300 are now identified and operated as 8 banks, B7:B0. Each bank has a companion bank that is accessed in parallel. Thus, a memory access to bank B0 accesses logical bank B0, which causes operation in physical banks B0 and B0' in parallel. It will be understood that the addressing is shown for purposes of illustration, and a controller within the memory device (not shown) and/or a memory controller connected to the memory device (also not shown) can include a mapping of the banks, and simply direct internal operations to the different banks based on the mode and the command selected.

Thus, in x16 mode, each physical group of banks generates 256 bits on prefetch, which are transferred out on 32 cycles. The bandwidth of the I/O interface can be stated as 256+256=512 bits of data. Compare the 512 bits I/O for memory device 400 with the 128 bits of I/O for memory device 300. Thus, in the x8 or bank group mode, the memory device can operate on ¼ of full I/O bandwidth. Such a configuration enables the connecting of more devices to the same bus, which can increase capacity per rank as compared to the x16 mode.

FIG. 5 is an embodiment of a table illustrating different low power memory device configurations, including a configuration that has bank mode and bank group mode. Table 500 illustrates different core architecture options for memory devices. Row 510 illustrates an LPDDR4 configuration. In LPDDR4, there are two types of configuration: a 2 channel x16 configuration, and a 2 channel x8 configuration. In the x16 configuration, there are 8 banks not separated into independent bank groups. The minimum burst length (BL) is 16, with a 2K page size, and tCCD of 8. In the x8 configuration, there are 8 banks not separated into independent bank groups. The minimum burst length is 16, with a 1K page size, and a tCCD of 8.

Row 530 illustrates an LPDDR5 configuration proposal. In this proposal, there are two configuration types: a 2 channel x16 configuration, and a 2 channel x8 configuration. In the x16 configuration, there are 4 bank groups with 2 banks each. The minimum burst length (BL) is 16, with a 2K page size, a tCCD_L of 12, and a tCCD_S of 8. In the x8 configuration, there are 8 bank groups having 2 banks each. The minimum burst length is 16, with a 1K page size, a tCCD_L of 12, and a tCCD_S of 8.

Row 540 illustrates an LPDDR5 configuration proposal. In this proposal, there are two configuration types: a 2 channel x16 configuration, and a 2 channel x8 configuration. In the x16 configuration, there are 2 bank groups with 4 banks each. The minimum burst length (BL) is 16, with a 2K page size, a tCCD_L of 12, and a tCCD_S of 8. In the x8 configuration, there are 4 bank groups having 4 banks each. The minimum burst length is 16, with a 1K page size, a tCCD_L of 12, and a tCCD_S of 8.

Row 520 illustrates an LPDDR5 configuration proposal in accordance with embodiments described herein. In this proposal, there are two types of configuration: a 2 channel x16 configuration, and a 2 channel x8 configuration. In the x16 configuration, there are 8 logical banks not separated into bank groups. The minimum burst length (BL) is 32, with a 2K page size, a tCCD_L of 16, and a tCCD_S of 16. In one embodiment, in the x8 configuration there are 2 bank groups having 8 banks each. In one embodiment, in the x8 configuration there are 4 bank groups having 4 banks each. The minimum burst length is 16 with a burst chop operation, with a 1K page size, a tCCD_L of 16, and a tCCD_S of 8. This proposal allows for a common die implementation between the x16 mode and the x8 mode. In one embodiment, a configuration setting selecting burst length can also set a configuration for the device to operate in bank group mode or bank mode. In one embodiment, if the device is configured (e.g., via a mode register or other configuration setting) for BL32, the device can operate the banks in bank mode. In one embodiment, if the device is configured for BL16, the device can operate the banks in bank group mode. Thus, in one embodiment, bank group mode or bank mode can be dependent on burst length.

Figure 6:
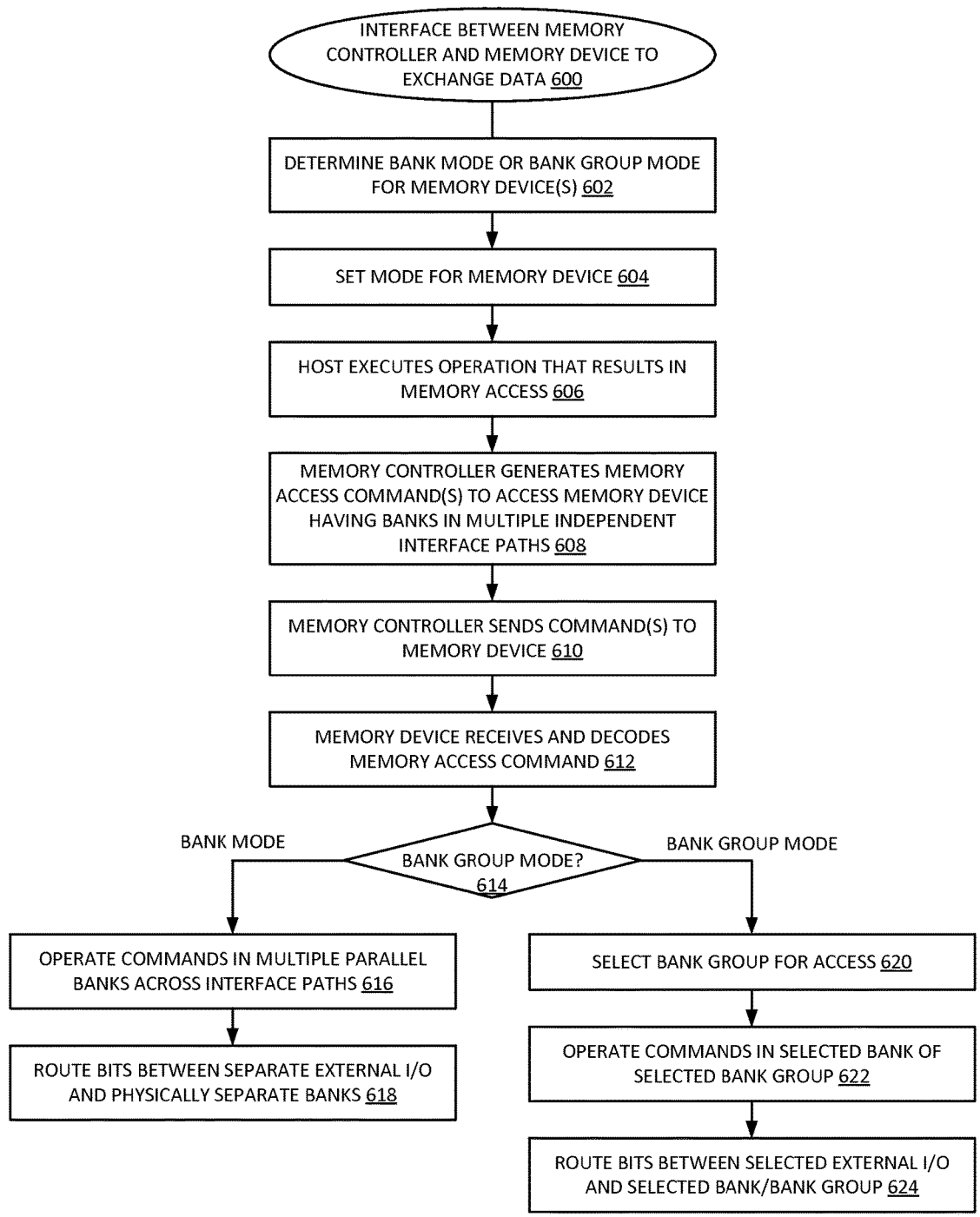
FIG. 6 is a flow diagram of an embodiment of a process for interfacing between a memory controller and a memory device to exchange data of different bandwidth based on an operating mode of the memory device.

FIG. 6 is a flow diagram of an embodiment of a process for interfacing between a memory controller and a memory device to exchange data of different bandwidth based on an operating mode of the memory device. Process 600 describes operation of a common memory die to interface with a memory controller in one of two different system bus bandwidth modes. A manufacturer produces a memory device chip that supports both a bank mode and a bank group mode, which can be selected for the memory device. In bank mode there are no bank groups, and in bank group mode the banks are accessed by reference to the specific bank and the bank group. In one embodiment, a developer determines whether to operate the memory in bank mode or bank group mode, 602. For example, a developer may integrate the memory device into a system, and design the system for operation with one mode or the other.

A computing system that includes a memory subsystem with the memory controller and memory device also includes a processor that executes the operations of the computing system. In one embodiment, the system is configured for the type of memory configuration to be used, and the system sets the memory controller to operate in a particular mode (e.g., via setting the memory with a mode register or other configuration setting mechanism), 604. The processor can include a host processor and/or various other processor circuits that execute operations that result in memory access, 606. The computing system can be a standalone system such as a laptop or tablet, or can be a portion of a larger system, or can be implemented in a variety of consumer electronic devices.

The memory controller generates one or more memory access commands to accomplish the memory access, 608. Specifically, the memory device has banks that can be selectively operated via multiple independent interface paths, which enables the devices to be operated in bank mode or bank group mode. In one embodiment, the memory controller is part of the host. The memory controller sends the commands to the memory device, 610. In one embodiment, the memory controller interleaves different commands to different banks, bank groups, ranks, and/or die to achieve full bandwidth utilization of the I/O available.

The memory device receives and decodes the memory access commands from the memory controller, 612. The memory device will operate on the separate memory banks differently depending on whether or not the device is in bank group mode, 614. If the memory device is not in bank group mode, 614 BANK MODE branch, the memory device performs operations to execute the commands in multiple parallel banks across different interface paths, 616. Thus, the banks are accessed as logical banks, with multiple physical banks being accessed for each bank access. The memory core routes the bits between the separate external I/O and the physically separate banks, 618.

If the memory device is configured for bank group mode, 614 BANK GROUP MODE branch, the memory core selects a bank group for access, 620. In one embodiment, the bank group is identified by the memory controller in the memory access command, and the memory core internal processor simply generates operations to execute the requested command. The memory core performs operations to execute the command in a selected bank of a selected bank group, rather than in multiple parallel physical banks, 622. In one embodiment, for read, one of the operations includes a burst chop operation to transmit only a portion of the prefetched data bits. The memory core routes the bits between the external I/O and the selected bank and bank group, 624. In the bank group mode, each bank is accessed independently, and the interface can be operated continuously by switching between bank groups without delay between the different bank groups.

Figure 7:
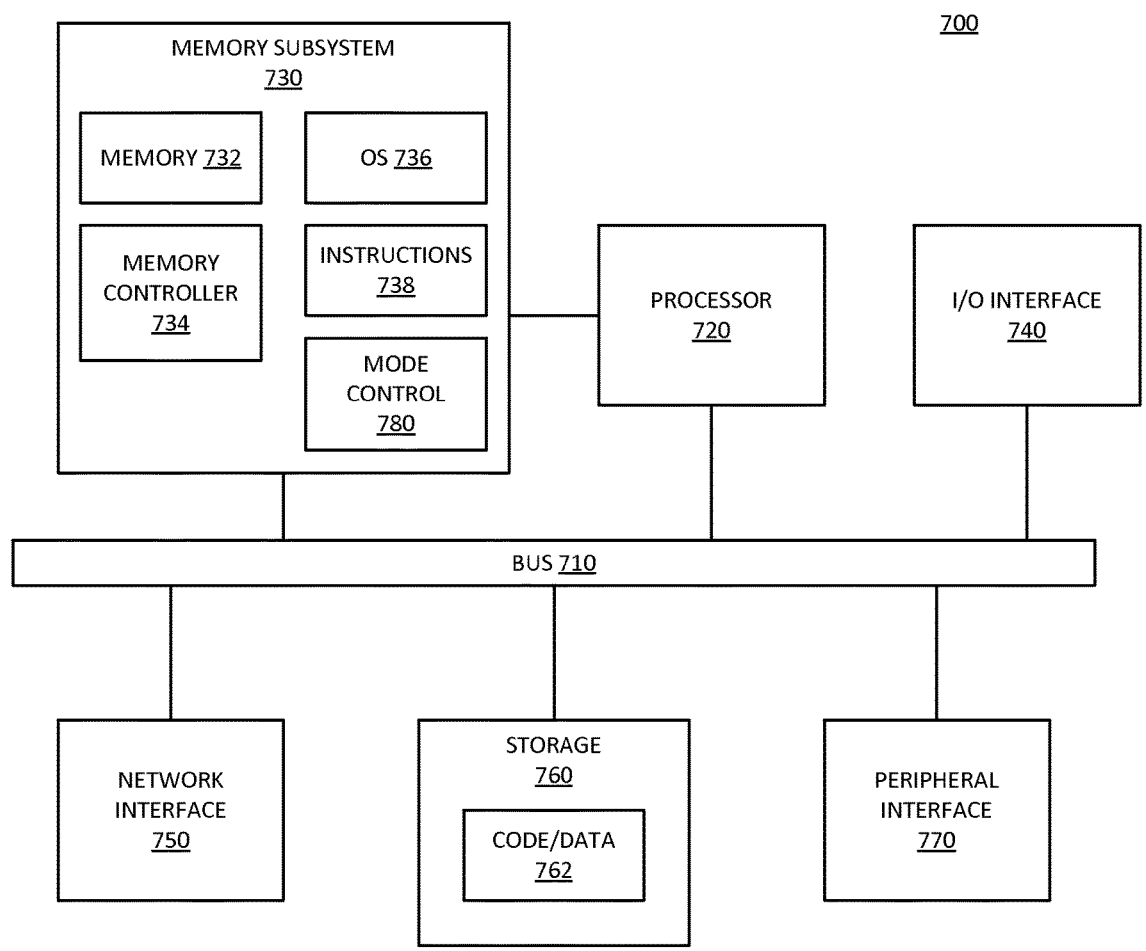
FIG. 7 is a block diagram of an embodiment of a computing system in which common die interfacing to data buses of different bandwidth can be implemented.

FIG. 7 is a block diagram of an embodiment of a computing system in which common die interfacing to data buses of different bandwidth can be implemented. System 700 represents a computing device in accordance with any embodiment described herein, and can be a laptop computer, a desktop computer, a server, a gaming or entertainment control system, a scanner, copier, printer, routing or switching device, or other electronic device. System 700 includes processor 720, which provides processing, operation management, and execution of instructions for system 700. Processor 720 can include any type of microprocessor, central processing unit (CPU), processing core, or other processing hardware to provide processing for system 700. Processor 720 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 represents the main memory of system 700, and provides temporary storage for code to be executed by processor 720, or data values to be used in executing a routine. Memory subsystem 730 can include one or more memory devices such as read-only memory (ROM), flash memory, one or more varieties of random access memory (RAM), or other memory devices, or a combination of such devices. Memory subsystem 730 stores and hosts, among other things, operating system (OS) 736 to provide a software platform for execution of instructions in system 700. Additionally, other instructions 738 are stored and executed from memory subsystem 730 to provide the logic and the processing of system 700. OS 736 and instructions 738 are executed by processor 720. Memory subsystem 730 includes memory device 732 where it stores data, instructions, programs, or other items. In one embodiment, memory subsystem includes memory controller 734, which is a memory controller to generate and issue commands to memory device 732. It will be understood that memory controller 734 could be a physical part of processor 720.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 can also correspond to interfaces in network interface 750.

System 700 also includes one or more input/output (I/O) interface(s) 740, network interface 750, one or more internal mass storage device(s) 760, and peripheral interface 770 coupled to bus 710. I/O interface 740 can include one or more interface components through which a user interacts with system 700 (e.g., video, audio, and/or alphanumeric interfacing). In one embodiment, I/O interface 740 can include a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. High definition can also refer to projected displays (e.g., head-mounted displays) that have comparable visual quality to pixel displays. Network interface 750 provides system 700 the ability to communicate with remote devices (e.g., servers, other computing devices) over one or more networks. Network interface 750 can include an Ethernet adapter, wireless interconnection components, USB (universal serial bus), or other wired or wireless standards-based or proprietary interfaces.

Storage 760 can be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 can be generically considered to be a "memory," although memory 730 is the executing or operating memory to provide instructions to processor 720. Whereas storage 760 is nonvolatile, memory 730 can include volatile memory (i.e., the value or state of the data is indeterminate if power is interrupted to system 700).

Peripheral interface 770 can include any hardware interface not specifically mentioned above. Peripherals refer generally to devices that connect dependently to system 700. A dependent connection is one where system 700 provides the software and/or hardware platform on which operation executes, and with which a user interacts.

In one embodiment, system 700 includes mode control 780, which enables the system to operate memory 732 in full bandwidth or partial bandwidth modes of operation in accordance with any embodiment described herein. Memory 732 is a common die memory device that supports different modes of operation, depending on selective configuration. The full bandwidth mode is a bank mode where all data prefetched is outputted on the I/O interface. For writes, the entire interface is used. In bank mode, multiple physical banks operate in parallel as a logical bank. The partial bandwidth mode is a bank group mode, where the same banks are operated as separate bank groups. In bank group mode, the full I/O bandwidth is not used, and each bank is operated as an independent bank in different bank groups.

Figure 8:
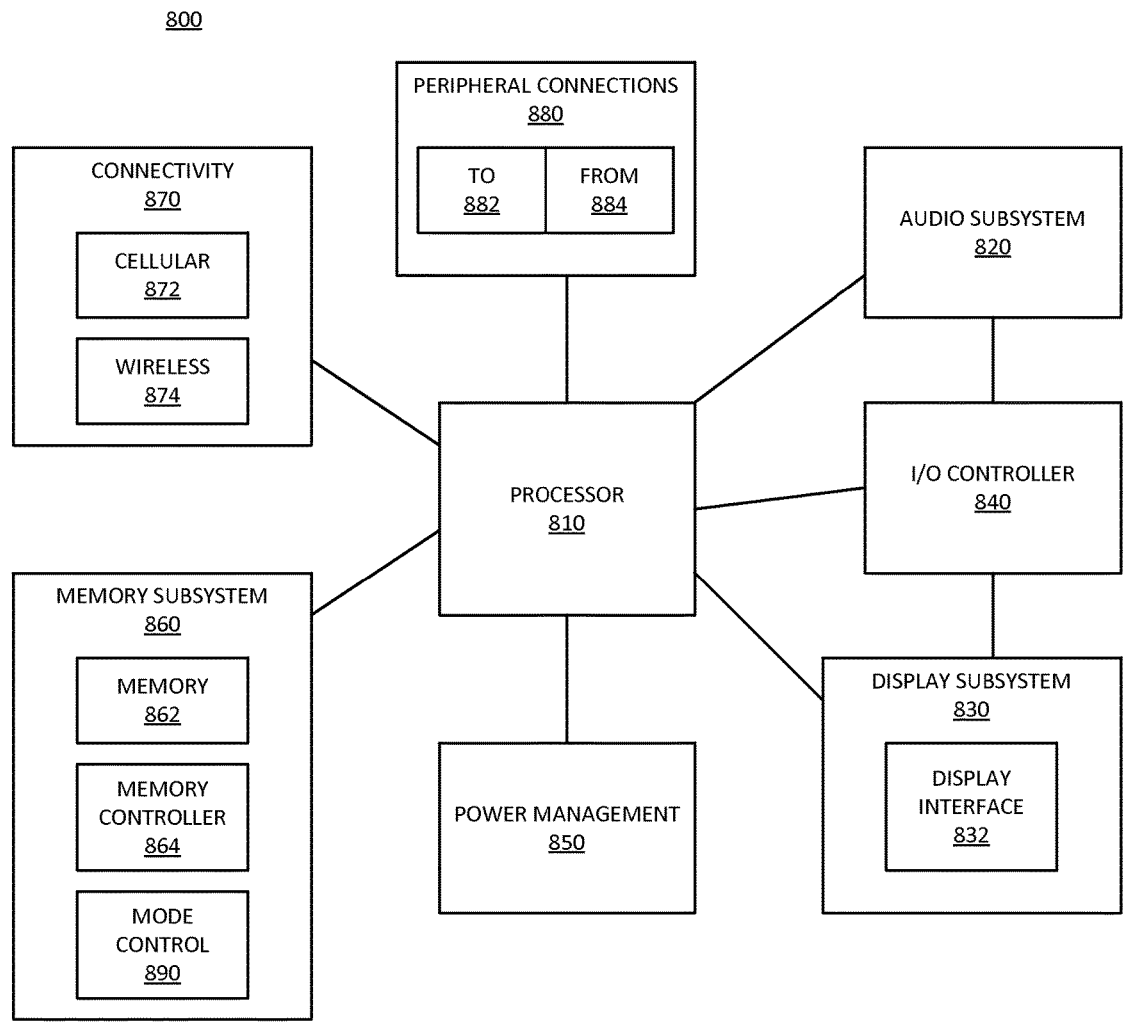
FIG. 8 is a block diagram of an embodiment of a mobile device in which common die interfacing to data buses of different bandwidth can be implemented.

FIG. 8 is a block diagram of an embodiment of a mobile device in which common die interfacing to data buses of different bandwidth can be implemented. Device 800 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations can also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user. In one embodiment, display subsystem 830 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features). In one embodiment, device 800 includes power management 850 that manages battery power usage, charging of the battery, and features related to power saving operation.

Memory subsystem 860 includes memory device(s) 862 for storing information in device 800. Memory subsystem 860 can include nonvolatile (state does not change if power to the memory device is interrupted) and/or volatile (state is indeterminate if power to the memory device is interrupted) memory devices. Memory 860 can store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810). Memory controller 864 includes a scheduler to generate and issue commands to memory device 862.

Connectivity 870 includes hardware devices (e.g., wireless and/or wired connectors and communication hardware) and software components (e.g., drivers, protocol stacks) to enable device 800 to communicate with external devices. The external device could be separate devices, such as other computing devices, wireless access points or base stations, as well as peripherals such as headsets, printers, or other devices.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 800 includes mode control 890, which enables the system to operate memory 862 in full bandwidth or partial bandwidth modes of operation in accordance with any embodiment described herein. Memory 862 is a common die memory device that supports different modes of operation, depending on selective configuration. The full bandwidth mode is a bank mode where all data prefetched is outputted on the I/O interface. For writes, the entire interface is used. In bank mode, multiple physical banks operate in parallel as a logical bank. The partial bandwidth mode is a bank group mode, where the same banks are operated as separate bank groups. In bank group mode, the full I/O bandwidth is not used, and each bank is operated as an independent bank in different bank groups.

In one aspect, a memory device to interface in a memory subsystem includes: at least two independent interface paths, an interface path including multiple memory banks; and logic in the memory device to selectively operate the interface paths in bank mode or in bank group mode, wherein in bank mode, at least one bank of a first interface path and at least one bank of a second interface path are accessed in parallel as a logical bank, wherein the at least one bank of the first interface path and the at least one bank of the second interface path are accessed in parallel in response to a command with a bank address identifier and without a bank group identifier; and wherein in bank group mode, the banks of the first interface path are accessed independently of the banks of the second interface path, in response to a command with a bank address identifier and a bank group identifier.

In one embodiment, the logic is to operate the interface paths in bank mode or in bank group mode based on configuration of a mode register. In one embodiment, the configuration of the mode register comprises a configuration setting the memory device is either bank group mode or bank mode. In one embodiment, the configuration of the mode register comprises a configuration of a burst length (BL). In one embodiment, wherein in bank mode, a memory access operates on full I/O (input/output) bandwidth. In one embodiment, wherein in bank group mode, a read access includes a burst chop operation to reduce the amount of data for the read access. In one embodiment, a burst chop operation reduces the data access size by half, resulting a memory access operating on ¼ of full I/O bandwidth. In one embodiment, wherein in bank group mode, memory access is interleaved between separate interface paths to result in full bandwidth utilization of a data interface bus to the memory device. In one embodiment, wherein in bank group mode, access timing is tCCD_L if back to back access is to banks in the same bank group, and is tCCD_S if back to back access is to banks in different bank groups, where tCCD_S is shorter than tCCD_L. In one embodiment, wherein in bank group mode, memory access is interleaved between separate interface paths of separate memory devices to result in full bandwidth utilization of a data interface bus to the memory devices. In one embodiment, further comprising the memory controller communicatively coupled to memory device.

In one aspect, a method for interfacing in a memory subsystem, includes: generating a memory access command to a memory device having at least two independent interface paths, an interface path including multiple memory banks; and sending the memory access command to the memory device to cause the memory device to operate on the memory access command differently, depending on whether the memory device is selectively configured for bank mode or bank group mode, wherein in bank mode, at least one bank of a first interface path and at least one bank of a second interface path are accessed in parallel as a logical bank, wherein the at least one bank of the first interface path and the at least one bank of the second interface path are accessed in parallel in response to a command with a bank address identifier and without a bank group identifier; and wherein in bank group mode, the banks of the first interface path are accessed independently of the banks of the second interface path, in response to a command with a bank address identifier and a bank group identifier.

In one aspect of the method, the method is to include operations in accordance with any embodiment set forth above with respect to the memory device. In one aspect, an article of manufacture comprising a computer readable storage medium having content stored thereon, which when accessed causes the performance of operations to execute a method for interfacing in a memory subsystem in accordance with any embodiment of the method. In one aspect, an apparatus for interfacing in a memory subsystem comprising means for performing operations to execute a method for interfacing in a memory subsystem in accordance with any embodiment of the method.

In one aspect, an electronic device with a memory subsystem includes: a memory controller; a memory device coupled to the memory controller, the memory device including at least two independent interface paths, an interface path including multiple memory banks; and logic in the memory device to selectively operate the interface paths in bank mode or in bank group mode, wherein in bank mode, at least one bank of a first interface path and at least one bank of a second interface path are accessed in parallel as a logical bank, wherein the at least one bank of the first interface path and the at least one bank of the second interface path are accessed in parallel in response to a command with a bank address identifier and without a bank group identifier; and wherein in bank group mode, the banks of the first interface path are accessed independently of the banks of the second interface path, in response to a command with a bank address identifier and a bank group identifier; and a touchscreen display coupled to generate a display based on data accessed from the memory device.

In one embodiment, the logic is to operate the interface paths in bank mode or in bank group mode based on configuration of a mode register. In one embodiment, the configuration of the mode register comprises a configuration setting the memory device is either bank group mode or bank mode. In one embodiment, the configuration of the mode register comprises a configuration of a burst length (BL). In one embodiment, wherein in bank mode, a memory access operates on full I/O (input/output) bandwidth. In one embodiment, wherein in bank group mode, a read access includes a burst chop operation to reduce the amount of data for the read access. In one embodiment, wherein a burst chop operation reduces the data access size by half, resulting in a memory access operating on ¼ of full I/O bandwidth. In one embodiment, wherein in bank group mode, memory access is interleaved between separate interface paths to result in full bandwidth utilization of a data interface bus to the memory device. In one embodiment, wherein in bank group mode, access timing is tCCD_L if back to back access is to banks in the same bank group, and is tCCD_S if back to back access is to banks in different bank groups, where tCCD_S is shorter than tCCD_L. In one embodiment, wherein in bank group mode, memory access is interleaved between separate interface paths of separate memory devices to result in full bandwidth utilization of a data interface bus to the memory devices. In one embodiment, further comprising at least one processor coupled to the memory controller. In one embodiment, the memory controller is part of the at least one processor. In one embodiment, further comprising a network interface communicatively coupled to the at least one processor.

In one aspect, a memory controller to interface with a memory device includes: logic to generate a memory access command to a memory device having at least two independent interface paths, an interface path including multiple memory banks; and logic to send the memory access command to the memory device to cause the memory device to operate on the memory access command differently, depending on whether the memory device is selectively configured for bank mode or bank group mode, wherein in bank mode, at least one bank of a first interface path and at least one bank of a second interface path are accessed in parallel as a logical bank, wherein the at least one bank of the first interface path and the at least one bank of the second interface path are accessed in parallel in response to a command with a bank address identifier and without a bank group identifier; and wherein in bank group mode, the banks of the first interface path are accessed independently of the banks of the second interface path, in response to a command with a bank address identifier and a bank group identifier.

In one embodiment, further comprising logic to set a mode register of the memory device to cause the memory device to operate in bank mode or in bank group mode. In one embodiment, the configuration of the mode register comprises a configuration setting the memory device is either bank group mode or bank mode. In one embodiment, the configuration of the mode register comprises a configuration of a burst length (BL). In one embodiment, wherein in bank mode, a memory access operates on full I/O (input/output) bandwidth. In one embodiment, wherein in bank group mode, a read access includes a burst chop operation to reduce the amount of data for the read access. In one embodiment, wherein a burst chop operation reduces the data access size by half, resulting a memory access operating on ¼ of full I/O bandwidth. In one embodiment, wherein in bank group mode, the logic is to interleave back to back memory accesses between separate interface paths to result in full bandwidth utilization of a data interface bus to the memory device. In one embodiment, wherein in bank group mode, access timing is tCCD_L if back to back access is to banks in the same bank group, and is tCCD_S if back to back access is to banks in different bank groups, where tCCD_S is shorter than tCCD_L. In one embodiment, wherein in bank group mode, the logic is to interface back to back memory accesses between separate interface paths of separate memory devices to result in full bandwidth utilization of a data interface bus to the memory devices. In one embodiment, further comprising a memory device communicatively coupled to memory controller.

In one aspect, a second method for interfacing in a memory subsystem includes: generating a memory access command to a memory device having at least two independent interface paths, an interface path including multiple memory banks; and sending the memory access command to the memory device to cause the memory device to operate on the memory access command differently, depending on whether the memory device is selectively configured for bank mode or bank group mode, wherein in bank mode, at least one bank of a first interface path and at least one bank of a second interface path are accessed in parallel as a logical bank, wherein the at least one bank of the first interface path and the at least one bank of the second interface path are accessed in parallel in response to a command with a bank address identifier and without a bank group identifier; and wherein in bank group mode, the banks of the first interface path are accessed independently of the banks of the second interface path, in response to a command with a bank address identifier and a bank group identifier.

In one aspect of the second method, the method is to include operations in accordance with any embodiment set forth above with respect to the memory controller. In one aspect, an article of manufacture comprising a computer readable storage medium having content stored thereon, which when accessed causes the performance of operations to execute a method for interfacing in a memory subsystem in accordance with any embodiment of the second method. In one aspect, an apparatus for interfacing in a memory subsystem comprising means for performing operations to execute a method for interfacing in a memory subsystem in accordance with any embodiment of the second method.

Flow diagrams as illustrated herein provide examples of sequences of various process actions. The flow diagrams can indicate operations to be executed by a software and/or firmware routine, as well as physical operations, such as operations executed by hardware logic. In one embodiment, a flow diagram can illustrate the state of a finite state machine (FSM), which can be implemented in hardware and/or software. Although shown in a particular sequence or order, unless otherwise specified, the order of the operations can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device to interface in a memory subsystem, comprising:
   input/output (I/O) interface hardware with a bandwidth to couple to a data bus;
   a memory array including a first bank group having multiple memory banks and a second bank group having multiple memory banks; and
   circuitry in the memory device to selectively couple the memory banks of the first bank group and the memory banks of the second bank group to the I/O interface hardware in bank mode or in bank group mode,
      wherein in bank mode, at least one bank of the first bank group and at least one bank of the second bank group are accessed in parallel as a logical bank, wherein the at least one bank of the first bank group and the at least one bank of the second bank group are accessed in parallel in response to a command with a bank address identifier and without a bank group identifier, wherein in bank mode the bandwidth is a full I/O bandwidth available in the I/O interface hardware; and
      wherein in bank group mode, the banks of the first bank group are accessed independently of the banks of the second bank group, in response to a command with a bank address identifier and a bank group identifier, wherein in bank group mode the bandwidth is only a portion of the full I/O bandwidth available in the I/O interface hardware.

2. The memory device of claim 1, wherein the circuitry is to couple the memory banks of the first and second bank groups in bank mode or in bank group mode based on configuration of a mode register.

3. The memory device of claim 2, wherein the configuration of the mode register comprises a configuration setting the memory device is either bank group mode or bank mode.

4. The memory device of claim 2, wherein the configuration of the mode register comprises a configuration of a burst length (BL).

5. The memory device of claim 1, wherein in bank group mode, a read access includes a burst chop operation to reduce the amount of data for the read access.

6. The memory device of claim 5, wherein a burst chop operation is to reduce the data access size by half, resulting a memory access operating on ¼ of full I/O bandwidth.

7. The memory device of claim 1, wherein in bank group mode, memory access is interleaved between memory banks of the separate bank groups to result in full bandwidth utilization of a data interface bus to the memory device.

8. The memory device of claim 1, wherein in bank group mode, access timing is tCCD_L if back to back access is to banks in the same bank group, and is tCCD_S if back to back access is to banks in different bank groups, where tCCD_S is shorter than tCCD_L.

9. The memory device of claim 1, wherein in bank group mode, memory access is interleaved between memory banks of the separate bank groups of separate memory devices to result in full bandwidth utilization of a data interface bus to the memory devices.

10. The memory device of claim 1, further comprising a memory controller communicatively coupled to memory device.

11. A method for interfacing in a memory subsystem, comprising:
generating a memory access command to a memory device having an input/output (I/O) interface hardware with a bandwidth to couple to a data bus, and a memory array including a first bank group having multiple memory banks and a second bank group having multiple memory banks; and
sending the memory access command to the memory device to cause the memory device to operate on the memory access command differently, depending on whether the memory device is selectively configured for bank mode or bank group mode,
wherein in bank mode, at least one bank of the first bank group and at least one bank of the second bank group are accessed in parallel as a logical bank, wherein the at least one bank of the first bank group and the at least one bank of the second bank group are accessed in parallel in response to a command with a bank address identifier and without a bank group identifier, wherein in bank mode the bandwidth is a full I/O bandwidth available in the I/O interface hardware; and
wherein in bank group mode, the banks of the first bank group are accessed independently of the banks of the second bank group, in response to a command with a bank address identifier and a bank group identifier, wherein in bank group mode the bandwidth is only a portion of the full I/O bandwidth available in the I/O interface hardware.

12. The method of claim 11, further comprising setting the memory device to in bank mode or in bank group mode via a mode register of the memory device.

13. The method of claim 11, wherein in bank group mode, a read access causes the memory device to perform a burst chop operation to reduce the amount of data for the read access.

14. The method of claim 13, wherein a burst chop operation reduces the data access size by half, resulting in a memory access operating on ¼ of full I/O bandwidth.

15. The method of claim 11, wherein in bank group mode, sending the memory access command comprises interleaving access commands between memory banks of the separate bank groups of the memory device to result in full bandwidth utilization of a data interface bus to the memory device.

16. The method of claim 11, wherein in bank group mode, sending the memory access command comprises interleaving access commands between memory banks of the separate bank groups of separate memory devices to result in full bandwidth utilization of a data interface bus to the memory devices.

17. An electronic device with a memory subsystem, comprising:
at least one processor;
a memory controller;
a network interface, the at least one processor communicatively coupled to the memory controller and the network interface communicatively coupled to the at least one processor;
a memory device coupled to the memory controller, the memory device including
input/output (I/O) interface hardware with a bandwidth to couple to a data bus;
a memory array including a first bank group having multiple memory banks and a second bank group having multiple memory banks; and
circuitry in the memory device to selectively couple the memory banks of the first bank group and the memory banks of the second bank group to the I/O interface hardware in bank mode or in bank group mode,
wherein in bank mode, at least one bank of the first bank group and at least one bank of the second bank group are accessed in parallel as a logical bank, wherein the at least one bank of the first bank group and the at least one bank of the second bank group are accessed in parallel in response to a command with a bank address identifier and without a bank group identifier, wherein in bank mode the bandwidth is a full I/O bandwidth available in the I/O interface hardware; and
wherein in bank group mode, the banks of the first bank group are accessed independently of the banks of the second bank group, in response to a command with a bank address identifier and a bank group identifier, wherein in bank group mode the bandwidth is only a portion of the full I/O bandwidth available in the I/O interface hardware; and
a touchscreen display coupled to generate a display based on data accessed from the memory device.

18. The electronic device of claim 17, wherein the circuitry is to couple the memory banks of the first and second bank groups in bank mode or in bank group mode based on configuration of a mode register.

19. The electronic device of claim 17, wherein in bank group mode, a read access includes a burst chop operation to reduce the amount of data for the read access.

20. The electronic device of claim 19, wherein a burst chop operation is to reduce the data access size by half, resulting in a memory access operating on ¼ of full I/O bandwidth.

21. The electronic device of claim 17, wherein in bank group mode, memory access is interleaved between memory banks of the separate bank groups to result in full bandwidth utilization of a data interface bus to the memory device.

22. The electronic device of claim 17, wherein in bank group mode, memory access is interleaved between memory banks of the separate bank groups of separate memory devices to result in full bandwidth utilization of a data interface bus to the memory devices.

* * * * *